(12) United States Patent
Schemmann et al.

(10) Patent No.: US 6,574,389 B1
(45) Date of Patent: Jun. 3, 2003

(54) OPTICAL COMMUNICATION WITH PRE-COMPENSATION FOR ODD ORDER DISTORTION IN MODULATION AND TRANSMISSION

(75) Inventors: Marcel F. Schemmann, Echt (NL); Venkatesh G. Mutalik, Manlius, NY (US)

(73) Assignee: Broadband Royalty, Wilmington, DE (US)

( * ) Notice: Subject to any disclaimer, the term of this patent is extended or adjusted under 35 U.S.C. 154(b) by 0 days.

(21) Appl. No.: 09/343,909

(22) Filed: Jun. 30, 1999

(51) Int. Cl.[7] .............................. G02B 6/28; H04B 10/18
(52) U.S. Cl. ...................... 385/24; 359/161; 359/124
(58) Field of Search ........................ 385/24; 359/124, 359/127, 132, 153, 161, 173, 188, 195; 372/28, 33, 26, 38.08; 375/296, 346; 455/43, 63, 296, 501

(56) References Cited

U.S. PATENT DOCUMENTS

| 5,262,883 A | * | 11/1993 | Pidgeon | ...................... 359/125 |
|---|---|---|---|---|
| 5,430,568 A | | 7/1995 | Little et al. | ................... 359/124 |
| 5,528,582 A | * | 6/1996 | Bodeep et al. | ................. 370/24 |
| 5,608,447 A | * | 3/1997 | Farray et al. | ................... 348/7 |
| 5,694,232 A | * | 12/1997 | Parsay et al. | ................ 359/113 |
| 5,699,176 A | * | 12/1997 | Cohen | ......................... 359/118 |

FOREIGN PATENT DOCUMENTS

| EP | 0524758 A2 | 1/1993 | ........... H04B/10/18 |
|---|---|---|---|
| EP | 0860955 A2 | 8/1998 | ......... H04B/10/155 |

* cited by examiner

Primary Examiner—Rodney Bovernick
Assistant Examiner—Mike Stahl
(74) Attorney, Agent, or Firm—Oblon, Spivak, McClelland, Maier & Neustadt, P.C.

(57) ABSTRACT

An in-line pre-compensation circuit distorts an electronic information signal prior to using the signal to modulate a laser beam in order to compensate for distortions resulting from transmitting the resulting optical signal through an optical fiber. The pre-compensation circuit is dynamically adjustable for different lengths of optical fiber for simple installation and maintenance of the system. The adjustment can be made from a front panel of a laser transmitter during operation. Even though the optical signal is more distorted at the output of the laser transmitter, the optical signal that arrives at the receiver is less distorted.

10 Claims, 5 Drawing Sheets

OPTICAL COMMUNICATION WITH PRE-COMPENSATION FOR ODD ORDER DISTORTION IN MODULATION AND TRANSMISSION

FIELD OF THE INVENTION

The invention is related to the fields of broadband cable television systems and is most closely related to laser optical communication links for such systems.

BACKGROUND OF THE INVENTION

In a cable television system, television programs are provided at a central head-end. The programs are distributed from the head-end through optical fiber tree networks to a multitude of local nodes in respective communities, and then further distributed from the local nodes through coaxial cable tree networks to customer interface units (CIUs) also called cable terminations. Currently, many of these systems are beginning to provide other communication services such as telephone service and/or computer networking services (e.g. internet connection) through the cable television system. Telephone and computer networking services require bi-directional communication in the cable television system. Forward data signals are transmitted similarly to television signals, as described above, and return data signals are transmitted through the same path in the reverse direction. That is, return signals are collected from the CIUs through the coaxial cable tree networks to the local nodes, back through the local nodes, and back through the optical fiber tree network to the head-end.

At the head-end, a multitude of electronic forward information signals for the television, telephone, and computer communications are used to modulate respective carrier signals of different frequencies. The modulated carrier signals are combined into an electronic forward signal that is used to modulate a forward laser beam to produce an optical forward signal carried by the forward laser beam. The modulated laser beam, carrying the optical forward signal, is transmitted through an optical fiber tree network to a multitude of the local nodes. At each local node an optical detector converts the optical forward signal back into an electronic forward signal. The reconverted electronic forward signal is transmitted from the local nodes through a coaxial conductor tree network to CIUs at homes and businesses of customers.

Telephone and computer equipment of the customer, are connected to the CIUs by the customers and the customer's equipment produces return signals that are transmitted by the CIUs into the coaxial tree. The return signals are multi-carrier modulated signals similar to the forward signals. The return signals travel back through the coaxial tree network to the local nodes. In the local nodes, the return signals are separated from the forward signals by diplex filters. The separated return signals are used to modulate a return laser beam to produce an optical return signal carried by the return laser beam. The optical return signal is transmitted back through the optical fiber tree network to the head-end where the optical return signals are converted back into electronic return signals by an optical detector for the return signals. The electronic return signals are demodulated and used for telephone and computer communications.

Those skilled in the art are directed to the following citations. U.S. Pat. No. 4,992,754 to Blauvelt discloses a pre-distortion network for compensating for second, third, and higher order distortion in a transmission device such as a semiconductor laser. U.S. Pat. No. 5,257,124 to Glaab discloses dual optical links to cancel out even order distortion. U.S. Pat. No. 5,430,568 to Little discloses a system in which 4 independent lasers each transmit different respective multi-carrier signals having different respective frequency bands of less than one octave each. At optical receivers, second order distortions are filtered out of each of the 4 signals and then the signals are combined into a single 54–500 MHz multi-carrier signal. Two pairs of lasers are used to transmit the 4 signals. For each pair of lasers, a first laser with a wavelength of 1310 nm transmits a first signal through a first fiber and a second laser with a wavelength of 1550 nm transmits a second signal through a second fiber; and wavelength division multiplexing (WDM) is used to combine the two signals from the first and second fiber into a first common 1310 nm zero dispersion fiber. Prior to reception, WDM is used to separate the first and second signals back into separate third and fourth fibers and separate respective receivers are provided to receive each signal. Electrical and/or optical compensating elements are provided to compensate for distortion due to dispersion which is not eliminated by grouping of frequencies discussed above. An electronic compensating element in the input of each laser need only compensate for third order distortion since the second order distortions are filtered out. Optical compensating elements in the second or third fiber compensate for the dispersion of the 1550 nm signal in the 1310 nm zero dispersion fiber. The optical compensating elements may be dispersion compensating optical fibers having dispersion profiles opposite to the dispersion profile experienced by the optical signals when transmitted over standard 1310 nm optical fibers to the receiver location. Such profiles represent second and third order harmonic distortion, known in the art as composite second order and composite triple beat, respectively.

The above references are hereby incorporated herein in whole by reference.

SUMMARY OF THE INVENTION

In one embodiment of the invention herein, an electronic information signal is used to modulate a laser beam resulting in an optical signal that is transmitted through an optic fiber tree network to an optical detector that converts the optical signal back into an electronic information signal. A pre-compensation circuit distorts the electronic information signal prior to using the signal for modulating the laser beam. The pre-compensation circuit compensates for odd order distortion due to transmitting the optical signal through the optical fiber as well as the odd order distortion due to using the electronic signal for modulating the laser beam. The optical signal produced by the modulation of the laser beam is more distorted at the laser beam modulator than at an optical detector at a remote end of the optical fiber. As the distorted signal travels through the optical fiber it becomes less distorted. The pre-compensation circuit and the laser are components of an optical transmitter for transmitting an input information signal. The optical detector is a component of an optical receiver for outputting an electronic information signal that approximately duplicates the input information signal at the transmitter. The third order distortion of the pre-compensation circuit is selected so as to reduce the total odd order distortion in an electronic signal that is output from the optical receiver.

Preferably, the laser is directly modulated distributed feedback (DFB) laser which transmits at an optical wavelength selected between 1500 to 1610 nm and the optic fiber has approximately zero dispersion at approximately 1310 nm. The pre-compensation circuit also compensates for even order distortions due to the modulation of the laser beam and due to the transmission through the optic fiber.

Preferably, the pre-compensation circuit also compensates for distortions due to the optical detector converting the optical signals back into electronic signals. The pre-compensation circuit also compensates for electronic amplification required prior to laser modulation, electronic amplification required for the output electronic signal after optical detection, and optical amplification required for the optical signal.

In another embodiment of the invention, a pre-compensation circuit compensates for odd order distortion due to transmitting an optical signal through an optical fiber, and the level of distortion provided by the pre-compensation circuit is adjustable depending on the length of the optical fiber.

Preferably, the pre-compensation circuit is automatically adjustable depending on a return signal from the receiver which is compared to a portion of the input electronic signal. Also, the pre-compensation circuit includes an input at a front panel for manually changing the level of distortion and an output from which the length of the fiber, for which the pre-compensation circuit is adjusted, can be determined.

Those skilled in the art can understand the invention and additional objects and advantages of the invention by studying the description of preferred embodiments below with reference to the following drawings that illustrate the features of the appended claims:

DETAILED DESCRIPTION OF THE PREFERRED EMBODIMENTS

Figure 1:
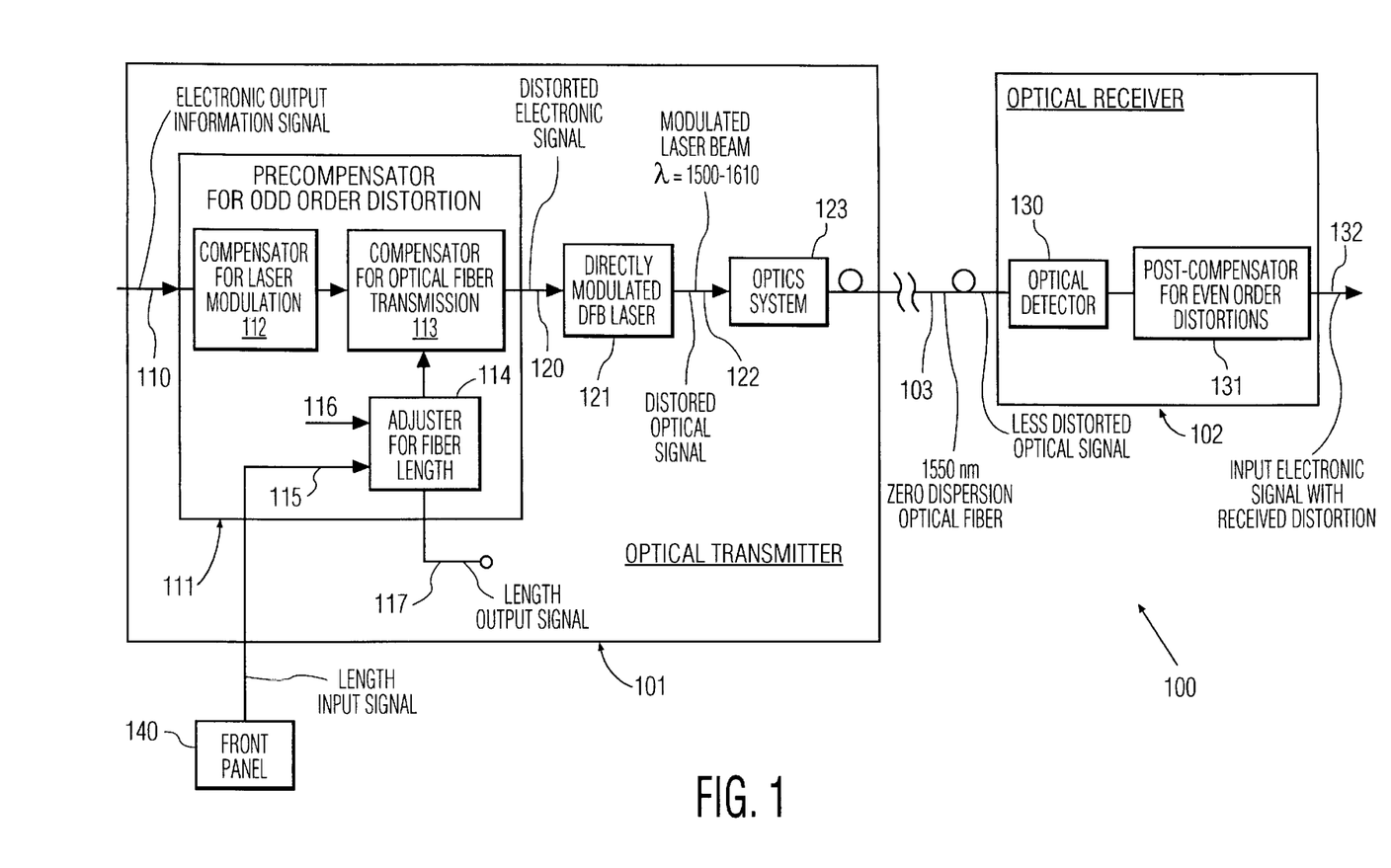
FIG. 1 illustrates a network of the invention with an optical transmitter and optical receiver interconnected by an optical fiber.

In the example embodiment of an optical communication link 100 shown in FIG. 1, an optical transmitter 101 transmits an optical signal to optical receiver 102 through optical fiber 103. The optical transmitter receives an electronic output information signal through transmission line 110 which is directed to pre-compensator 111 for compensating for odd order distortion. The pre-compensator includes a first in-line compensator 112 to distort the output electronic signal for compensating for odd order distortion during modulation of a laser beam using the electronic output signal, and a second in-line compensator 113 to further distort the output electronic signal for compensating for odd order distortion during the transmission of the optical signal through the optical fiber. The pre-compensator also includes an adjuster 114 with an output to the second compensator for adjusting the distortion depending on the length of optical fiber 103. The adjuster has a input 115 from front panel 140 for manually inputting a signal depending on the length of the optical fiber. An input 116 is also provided for an automatic adjustment which may be based on a return signal from the receiver 102 as described below with reference to FIG. 2 and an output 117 for providing a signal from which the optical fiber length, for which the second compensator is adjusted, can be determined.

Circuits for compensating for odd order distortions are well known in the art and those skilled in the art can provide the first and second compensators based on these known circuits. The circuits for the first and second compensator and for the adjuster can be separate circuits as shown, or a single circuit performing the function of two or more of these separate circuits can be provided. The length input signal may be a manual input such as an adjustment of a potentiometer at the front panel as shown or a return signal from the optical receiver as described below.

A distorted signal 120 is output from pre-compensator 111 and directed to laser 121 and used to directly modulate the laser so as to modulate laser beam 122 in order to convert the distorted electronic signal into an optical signal carried by the laser beam. An optics system 123 contains lenses to focus the laser beam into the end of an optical fiber for transmitting the optical signal through the fiber to receiver 102. For an amplitude modulated virtual side band (AM-VSB) signal or a quadrature phase key signal with 32 levels (QSK-32) signal, the optical signal may be transmitted through the optical fiber from the optical transmitter to the optical receiver through a distance of over 100 km.

Preferably, the laser is a directly modulated laser as shown, but an external modulator could be provided. Also, the laser is preferably a distributed feedback (DFB) laser as shown, but other types of lasers could be used. Optical systems to direct laser beams into optical fibers are well known. The type of optical fiber is preferably single mode with approximately zero dispersion at an optical wavelength of about 1310 nm. Part of the invention lies in the recognition that transmission of optical signals through zero dispersion fiber results in odd order harmonics which become significant at the transmission distances when the steps disclosed herein to reduce even order and other odd order distortions are implemented. Part of the invention is that the optical signal in the fiber at the transmitter contains more odd order distortions than the optical signal in the fiber at the receiver.

Optical receiver 102 includes an optical detector 130 connected at another end of optical fiber 103, which is remote from the optical transmitter. The optical detector converts the optical signal into an electronic information signal. The optical receiver also includes an in-line post-compensator 131 to linearize the electronic signal to provide an input electronic signal in transmission line 132, with minimal distortions with respect to the output electronic signal that was provided to the pre-compensator. That is, the input electronic signal in transmission line 132 of the receiver is approximately a duplicate of the output electronic signal in transmission line 110 of the transmitter.

The optical detector may be an avalanche photodiode or more preferably a PIN photodiode or any other type of low noise photo detector. The post-compensator may include electronic circuits for linearizing signals containing even order distortions. Alternatively, or in addition, the carrier frequencies for critical signals may be kept within a range of one octave so that all second order distortions caused by these carriers are outside of the one octave range of frequencies and the post-compensator may include a pass band filter for filtering out these second order distortions. Band pass circuits for performing such filtering are well known in the art. Alternatively or in addition, even order distortion could be reduced by providing circuitry for providing even order distortions in the pre-compensator and/or by using dual signal paths with one inverted signal as in the patent by Glaab discussed above in the background.

In addition to distortions due to laser beam modulation and transmission through the optical fiber, pre-compensator 111 and post-compensator 131 may also include circuitry to compensate for distortions due to optical amplifiers and distortions due to electronic amplifiers, optical detectors, modulators, demodulators, and other electronics which may cause odd or even order distortions in the transmission link.

Alternatively, the DFB laser shown in FIG. 1 could be replaced by discrete laser and a discrete laser beam modulator as shown below in FIG. 2. If properly selected a combination of separate laser and modulator can produce an optical signal with minimal second order distortion due to laser beam modulation. However such a system is more expensive and complex.

FIG. 1 shows in-line compensators rather than the more common parallel compensators as shown below in FIG. 2. In-line compensators are preferred because they operate at higher frequencies and such circuits are simpler.

Figure 2:
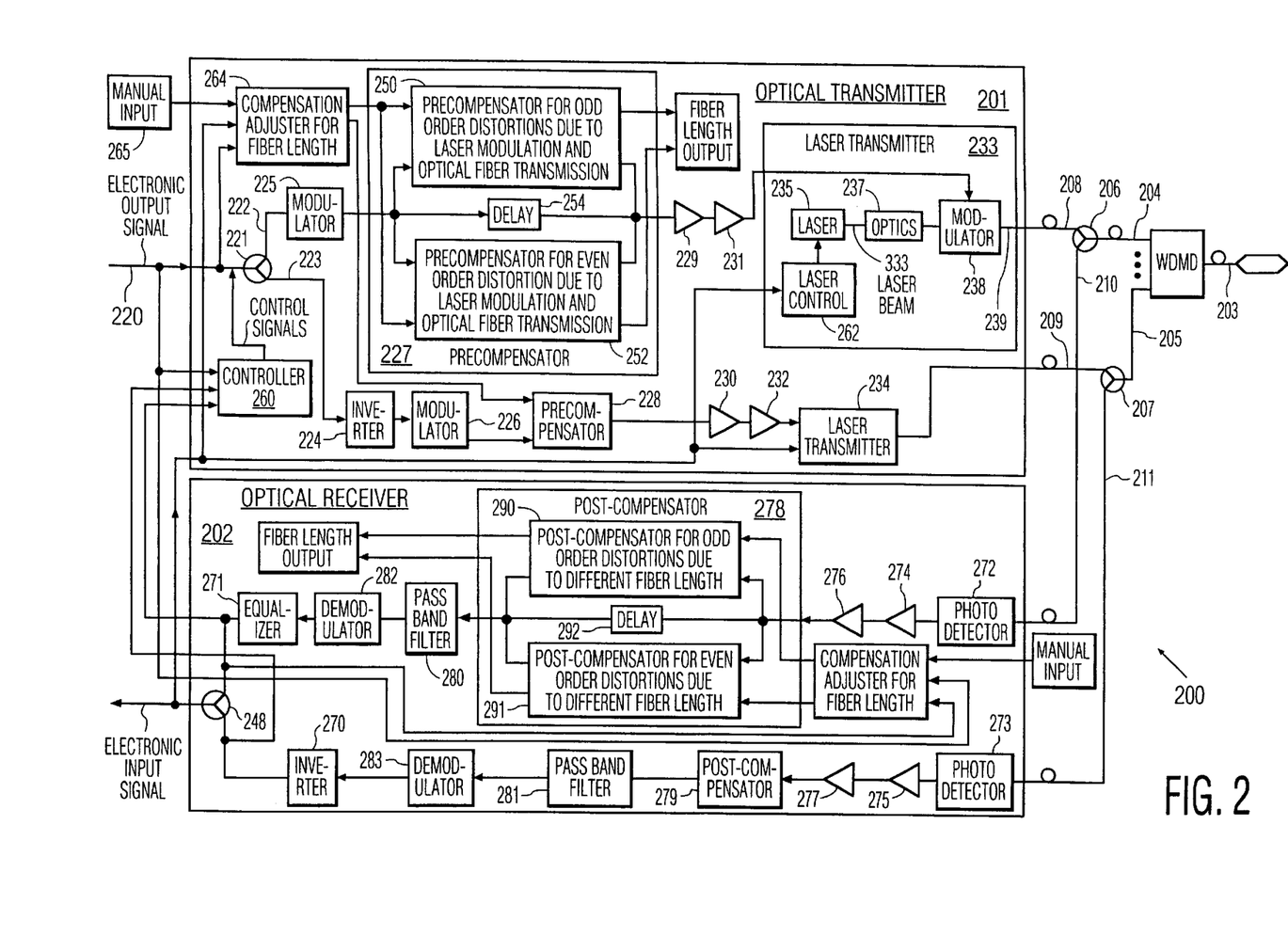
FIG. 2 shows another embodiment of the invention with an optical transmitter and optical receiver for the same node.

FIG. 2 illustrate a portion of a node 200 of another example embodiment of the invention, in which an optical transmitter 201 transmits optical signals and an optical receiver 202 receives optical signals from other nodes, from a common optical fiber 203. A wavelength division multiplexer/demultiplexer (WDMD) connects between the common optical fiber 203 carrying a multitude of optical signals in each direction, the signals carried in the same direction having different respective wavelengths, and multiple bidirectional optical fibers 204 and 205 each carrying bidirectional signals of one single respective wavelength. That is, the forward signal and the return signal in each bidirectional fiber such as fiber 204, have approximately the same wavelength. The wavelengths of the signals in fiber 204 are different than those in fiber 205. Optical splitters 206 and 207 each direct a respective output optical signal from optical transmitter 201 through a output optical fiber 208 and 209 respectively into a respective single wavelength fiber 204 and 205. The optical splitters also each direct a respective input optical signal from respective single wavelength fibers 204 and 205 through input optical fibers 210 and 211 respectively to optical receiver 202. The optical output path from the lasers may include optical isolators (not shown) so that the input signals do not affect the modulation or wavelength of the laser beams.

A transmission line 220 provides an electronic output information signal to optical transmitter 201. In the optical transmitter the signal is split by splitter 221 into two transmission lines 222 and 223 which directs the output signal into two transmission circuits which may be identical except for an inverter 224.

Some details of the transmitter circuit are only shown in one of the identical circuits to simplify the figure, and identical portions of the transmission circuits will be described with reference to only one of the circuits to simplify the description. Each transmission circuit includes a modulator 225 to modulate the electronic output signal. The modulated signal is distorted by a pre-compensator 227 to compensate the signal for distortions that occur later in the signal path, including those due to laser modulation and transmission through the optical fibers. The distorted output signals are amplified by pre-amplifier 229 and one or more power amplifiers 231.

Laser transmitter 233 converts the distorted, modulated, amplified output signal into an optical output signal. The amplified output signal is used to modulate a laser beam 333 produced by laser 235, and optics 237 direct the laser beam into a proximate end 239 of optical fiber 208. Each pre-compensator 227, 228 includes an odd order pre-compensator 250 to distort the electronic output signal to compensate for odd order distortions in the output signal due to both the modulation of the laser beam and the transmission of the optical output signal through the optical fiber tree network. Also each pre-compensator includes an even order pre-compensator 252 for distorting the electronic output signal to compensate for even order distortions due to both the modulation of the laser beam and the transmission of the optical output signal through the optical fiber tree network. The pre-compensator 227 also includes a delay circuit 254 that delays a non-distorted output signal with the same delay that is produced by the odd order pre-compensator and even order compensator. The compensators 250 and 252 provide paths parallel to the main path through delay 254. Thus, these are not in-line compensators, as is preferred in the invention, but which may be used where the advantages of in-line compensation are not critical.

Optical transmitter 201 also includes a controller 260 to provide control signals in the output signal depending on the input signal. The input signal also includes such control signals generated at another node (not shown) depending on the output signal of this node, as received by the other node (not shown).

Laser control 262 uses the control signals in the input signal to control the operation of laser 235. Compensation adjuster 264 also uses the control signals in the input signal to adjust the compensation provided by the pre-compensator in order to minimize the distortion in the other input signal of the other local node. Manual input 265 at the front panel of the transmitter provides adjustment for initially calibrating the compensation adjustment.

Optical receiver 202 similarly, includes two reception circuits that are connected at the end of the reception circuits by a combiner 248 to form the electronic input signal. The two reception circuits may be identical except for inverter 270 and equalizer 271 each at the end of one of the reception circuits. Again, some details are only shown in one of the reception circuits and the identical portions of the reception circuits will be described with reference to only one of the circuits in order to simplify the description. Each reception circuit includes a photo detector 272 connected to an input fiber 210. The photo detector converts an optical signal in the optical fiber into an electronic input signal. The electronic signal is amplified by pre-amplifier 274 and one or more power amplifiers 276. The amplified signal may include distortions due to different lengths of optical fiber, because the same optical signal maybe transmitted to more than one local node, and the length of the optical fiber between the transmitting and receiving nodes typically varies for different receiving nodes. Post compensator 278 linearizes the input signal to compensate for the difference between the actual transmission length and the transmission length for which the signal is pre-compensated for. The linearized signal is filtered by a band pass filter 280 to remove inter modulation signals outside of the frequency band of the signal. Even though the system preferably uses an inverted signal dual link to minimize even order distortions, the even order distortions due to direct laser modulation, photo detection, odd order distortion compensation, and electronic amplification will not be exactly equal and because the wavelengths of the dual signals are different even order distortions due to transmission through the fiber and due to optical amplification will be different so that further reductions of even order distortions may be significant. Preferably, the output and input signals are multi-carrier multi-level QAM signals in which all the carrier frequencies of critical signals (e.g. analog television signals) are within an octave, so that most even order distortion can be filtered out of the signal. More preferably, all the carrier frequencies are within half an octave so that fourth order distortions can also be filtered out. The signal may also include less-critical signals (e.g. digital signals) with carrier frequencies that are outside of the octave of frequencies used for the critical signals and these less-critical signals would not be transmitted through the band pass filter. The portions of the reception circuits for handling the less-critical signals would be essentially the same as for handling the critical signals except pass band filtering is not as critical. The filtered signals are demodulated by demodulator 282 and then the demodulated signal is equalized by equalizer 271 and combined by combiner 248 with another input signal so that even order distortions are further reduced.

Post compensators 278 and 279 may be identical, but only details of post-compensator 278 are shown to simplify the illustration. Each post-compensator includes post-compensator 290 for compensating for odd order distortions and post-compensator 291 to compensate for even order distortions, and delay 292 to delay the non-linearized signal the same amount as the delay of the post-compensators. The post-compensators are only required in systems where signals are transmitted to more than one local node that may have different respective transmission distances. Also, it may be convenient to compensate for distortions due to components in the receiver using a compensator at the receiver so that the transmitting node does not have to provide different compensation for different receiving nodes. Again the post-compensators 290, 291 in FIG. 2 form a parallel circuit with delay 292 so that they are not the in-line post-compensator 131 shown in FIG. 1 that is preferred, but if the advantages of in-line post-compensation are not required or critical, then the parallel arrangement shown can be used.

Previously, odd order distortions of optical signals due to transmission through optical fiber have not been recognized or have been ignored because distortions due to laser modulation and even order distortions due to transmission through the optical fiber overwhelm the odd order distortions due to transmission through the fiber. The applicants have discovered that reductions in distortion due to laser modulation along with the large reduction in even order distortions in the circuits of this embodiment result in a signal where the odd order distortions due to optical transmission through zero dispersion fiber are significant and in the invention such odd order distortion is also compensated for.

The dual link inverted signal scheme herein, greatly reduces even order distortions. By including circuits for amplification and odd order compensation within the dual circuits, even order distortions due to these circuits can also be greatly reduced. Similarly providing all the carrier frequencies within one octave or even better providing all the carrier frequencies within one half of an octave also greatly reduces even order distortion. Also, pre-compensation and/or post-compensation for even order distortion greatly reduces even order distortions. The inventors recognize that each of these methods has advantages and disadvantages so that by combining two or more of these methods reduced distortion can be achieved in real systems. The dual link scheme is independent of changes to the length of the common fiber, and eliminates higher order distortions, but does not eliminate all even order distortion because the electrical circuits in the respective links are different. Electronic parts such as lasers, photo-detectors and other electronic circuits vary within specified tolerances. The filtering scheme is also independent of changes in the length of the common fiber, but is only practical for eliminating second and possibly fourth order distortions. Much of the higher order even-order distortions remain after filtering. Pre-compensation for even order distortions can be adjusted for the length of the fiber to minimize distortions, but circuits which precisely cancel out higher order even order distortions are complex. Also in a CATV system some of the nodes are at different distances from the head end so that some post-compensation for even-order distortion is needed and that also needs to be adjustable for changing lengths of the common fiber when the system is rerouted. The lengths of the cables are often changed due to construction and upgrading. By combining these methods together even order distortions can be minimized in the system.

Figure 3:
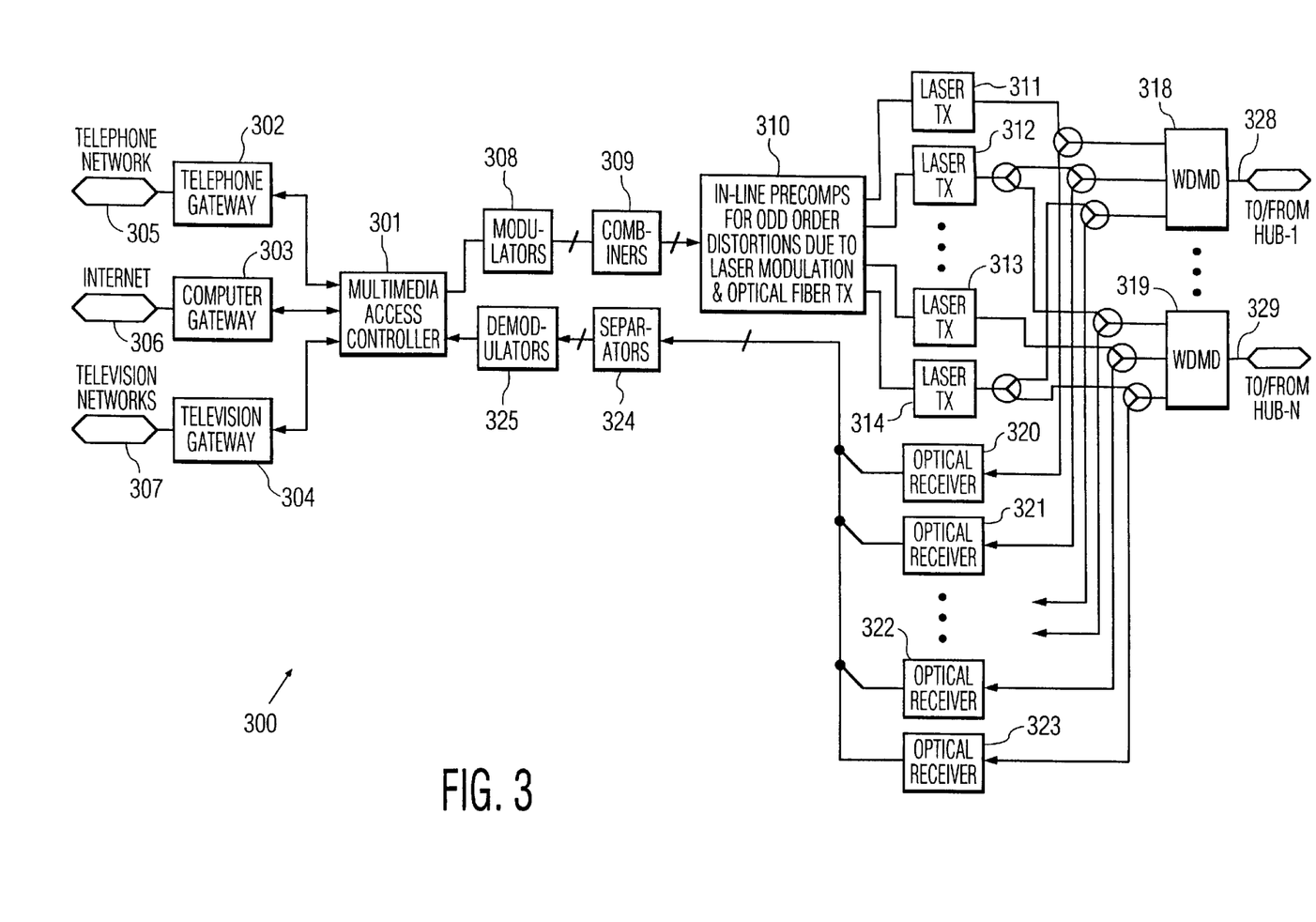
FIG. 3 illustrates a head-end of a cable television network of the invention.
Figure 4:
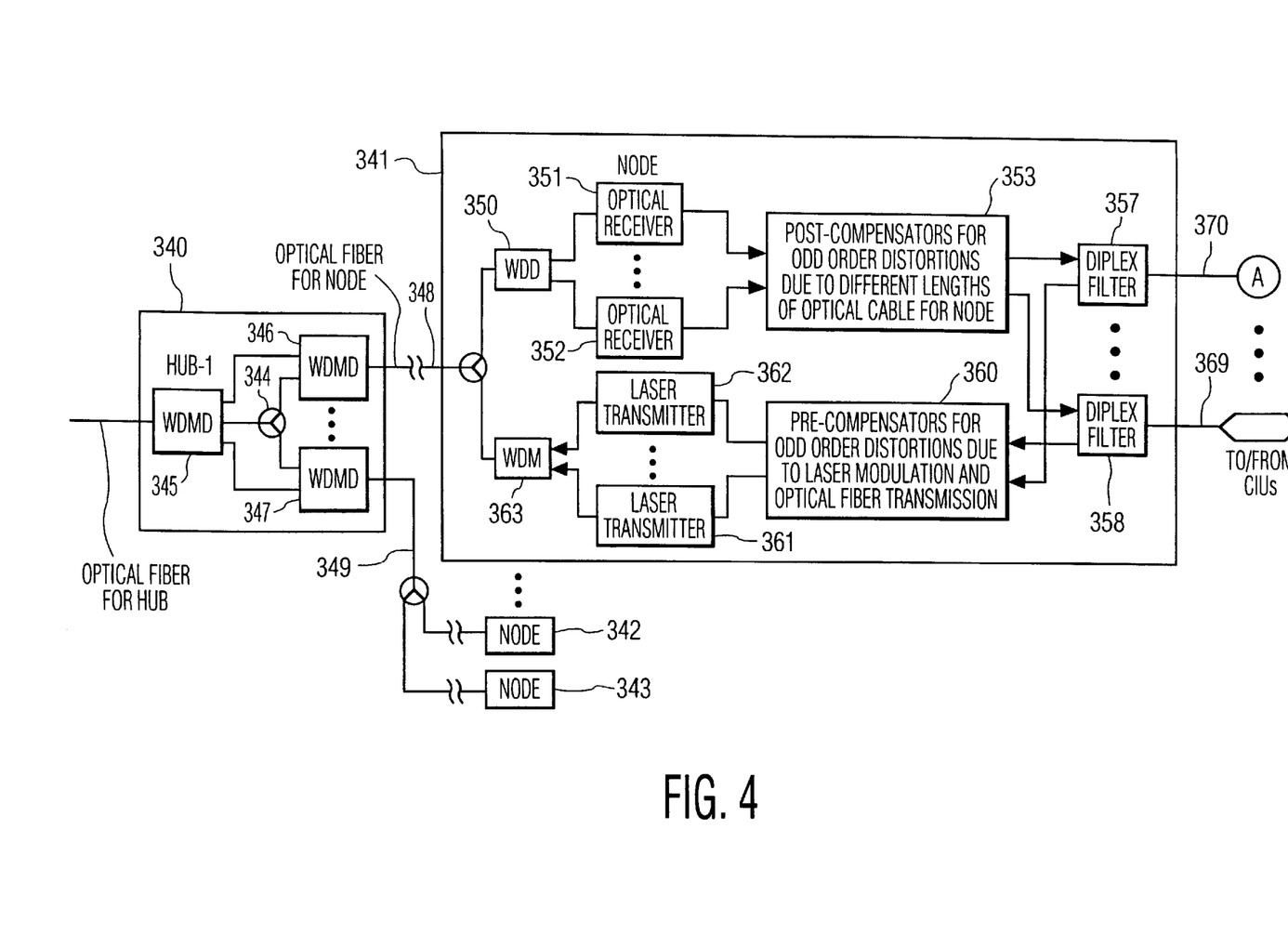
FIG. 4 illustrates a hub and local nodes of the cable television network of FIG. 3.
Figure 5:
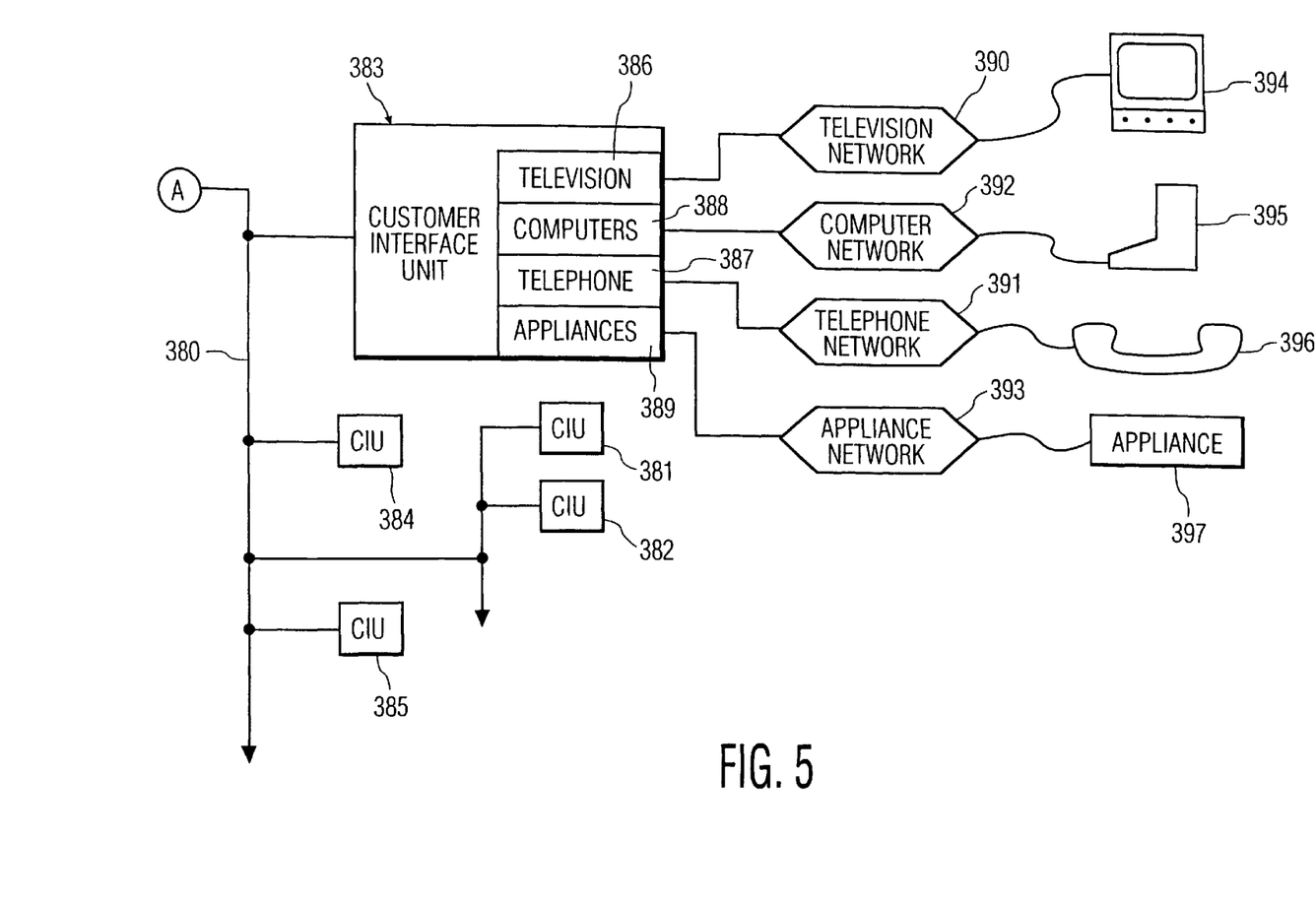
FIG. 5 shows customer interface units of the cable television network of FIG. 3.

FIGS. 3–5 illustrate an example embodiment of the broadband communication system of the invention. In FIG. 3, a head-end 300 includes a multimedia access controller 301 communicating with a telephone gateway 302, a computer gateway 303, and a television gateway 304. The telephone gateway provides telephone communications with the telephone network so that customers connected to the broadband system can communicate by telephone with persons or computer systems which are connected to the telephone, network outside of the broadband system. The computer gateway provides high speed communications with computer systems such as the internet. The telephone gateway can also be used for lower speed access to such computer systems. The television gateway receives television programs, for example, by satellite download from television studios. In addition, the gateway may provide television programs from one of the broadband system customers for unlink for distribution outside of the system. The television gateway may also provide interactive television for customers of the broadband network.

Electronic information signals are routed from the access controller to modulators 308 which modulate carrier signals of different frequencies with respective information signals. The modulated signals are combined by combiners 309 to provide a multi-carrier signal. The modulators and combiners may be combined into one or more circuits or separated as shown. The multi-carrier modulated signal is then routed to in-line pre-compensators 310 which distort the modulated electronic information signals to compensate for odd order distortions due to laser modulation and optical fiber transmission. The pre-compensated signals are routed to laser transmitters 311–314 where the pre-compensated signals modulate respective laser beams of respective lasers to produce respective optical information signals. The optical information signals are routed to wavelength division multiplexers/demultiplexers WDMD's 318–319 which combine the laser beams into common optical fibers 328, 329 and transmit them to respective hubs described below. The WDMD's also separate optical signals received from the hubs. The received signals are routed to optical receivers 320–323 which convert the received optical signals into respective electronic information signals. The received electronic signals are routed to tuners or separators 324 to separate the signals and then to demodulators 325 which convert the signals to base band signals. Alternatively, the separators and demodulators may be combined into one or more circuits. The base band signals are routed to access controller 301 where they are used to control the access controller or are provided to the correct gateway.

FIG. 4 shows a hub 340 connected to local nodes 341–343. The hub includes a common WDMD 345 for communication through a common fiber to the head-end. The common WDMD communicates with respective WDMD's 346–347 for each local node connected to the hub.

Local nodes 341–343 may be identical, but relevant details are only shown for local node 341 for simplicity of drawing and description. Local node 341 includes a wavelength division demultiplexer (WDD) 350 for the local node. WDD 350 separates optical signals according to light wavelength. The separated optical signals are routed to optical receivers 351–352 which convert the optical signals to forward electronic signals. The forward electronic signals are routed to post-compensators 353 which linearize the forward electronic signals to compensate for differences in the length of transmission through optical fibers for different local nodes. The forward electronic signals are then transmitted through coaxial cable tree networks (369–370) to customer interface units of FIG. 5, described below.

In the local node, return signals from the customer interface units are separated from the forward signals in the coaxial cable networks by respective diplex filters 357–358. The diplex filters may be pass band filters where the return signals have frequencies within a different band than the forward signals. The return signals are modulated multi-carrier signals from the customer interface units described below. The separated electronic return signals are routed to pre-compensators 360 for distorting the return signals so as to compensate for odd order distortions due to subsequently modulating a laser beam with the return signals and transmitting the modulated optical signal in the laser beam through optical fiber. Laser transmitters 361–362 produce respective laser beams which are modulated by respective return signals. The laser beams have different optical wavelengths and are routed to wavelength division multiplexer WDM 363 for combination into a single common fiber 348 for transmission back through hub 340, and then back to head-end 300.

FIG. 5 illustrates a coaxial tree network 380 for routing signals between the local node shown in FIG. 4 and customer interface units 381–385. Each customer interface unit connects between the coaxial cable network and a respective customer's television network 390, computer network 392, telephone network 391, and appliance network 393.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the following claims.

We claim:

1. A pre-transmission compensation circuit for laser communications through an optical fiber, comprising:

signal output means for providing an electronic output signal for information communications;

pre-transmission compensation means to electronically distort the electronic output signal prior to using the electronic output signal to modulate a laser beam to convert the electronic output signal to an optical output signal, for compensating for odd order distortions due to the optical signal traveling through optical fiber due to the interaction between the laser beam and the dispersion of the optical fiber; and signal directing means for providing the distorted electronic signal to means for modulating a laser beam;

and wherein:

the pre-compensation means are also for compensating for distortions due to modulation of a directly modulated laser;

the pre-compensation means are also for compensating for distortions due to modulation of a distributed feedback laser;

the pre-compensation means are also for compensating for odd order distortion of the optical signal due to modulating the laser beam;

the pre-compensation means are also for compensating for distortions due to the optical signal trammeling through standard single mode fiber with a zero dispersion at approximately 1310 nm;

the pre-compensation means are also for compensating for distortions due to the laser beam having a wavelength approximately between 1500 and 1610 nm traveling through fiber;

the pre-compensation means are also for dynamically adjusting the distortion to compensate for different lengths of travel of the optical signal through optical fiber;

the adjusting can be made from a front panel;

the adjusting includes providing an adjustment signal to the pre-compensator;

the pre-compensation means are also for compensating for even order distortions due to using the electronic signal to modulate the laser beam; and the pre-compensation means are also for compensating for even order distortions due to transmitting the optical signal through the optical fiber.

2. A pre-transmission compensation circuit for laser communications through an optical fiber, comprising:

signal input means for providing an electronic signal for information communications;

pre-transmission compensation means to electronically distort the electronic signal prior to using the electronic signal to modulate a laser beam to convert the electronic signal to an optical signal, for compensating for distortion of the optical signal due to the optical signal traveling through optical fiber;

means for adjusting the distortion for changes in the length of optical fiber to reduce the distortion of the optical signal at a receiver at a distal end of the fiber from the laser; and signal output means for providing the distorted electronic signal to a laser for modulating the laser beam.

3. The pre-transmission compensation circuit of claim 2, in which:

the adjusting means adjust the distortion during operation of the pre-transmission compensation circuit;

the adjusting means adjust the distortion from a front panel;

the pre-transmission compensation means include an in-line pre-transmission compensation circuit;

the pre-transmission compensation means also compensate for odd order distortion of the optical signal due to modulating the laser beam;

the distortion due to the optical signal traveling through optical fiber that the pre-transmission compensation means compensates for includes odd order distortion;

the pre-transmission compensation means automatically adjust for the distortion to reduce the distortion of the optical signal at an optical receiver depending on a return signal from the receiver of the optical signal at a distal end of the optical fiber from the laser to minimize distortion in an electronic information signal output from the optical receiver with respect to the input electronic information signal; and the pre-transmission compensation means provide a signal indicating the length of the optical fiber for which the distortion is adjusted to compensate.

4. A laser transmitter comprising:

signal input means for providing an electronic signal;

a laser for producing a laser beam with a predetermined wavelength of light;

pre-transmission compensation means to electronically distort the electronic signal prior to using the electronic signal to modulate the laser beam to convert the electronic signal into an optical signal, for compensating for distortion due to transmitting the optical signal through zero dispersion fiber and for compensating for distortion due to modulation of the laser beam;

means for adjusting the distortion for changes in the length of optical fiber to reduce the distortion of the optical signal at a receiver at a distal end of the fiber from the laser;

means for modulating the laser beam;

an optics system for directing the modulated laser beam into the optical fiber.

5. The laser transmitter of claim 4 in which:

the pre-compensation means are in-line;

the distortion compensated for by the pre-transmission compensation means includes odd order distortion due to transmitting the optical signal through zero dispersion fiber and odd order distortion due to modulation of the laser beam;

the laser is a directly modulated laser so that the laser and means to modulate the laser beam are integral;

the laser is a distributed feedback laser; and the laser has a wavelength approximately between 1500 and 1610 nm.

6. An information communication system, comprising:

a network of optical fibers;

a first node and second local node communicating through an optical fiber network, each comprising:

means for providing an output electronic information signal;

pre-transmission compensation circuit means to electronically distort the output electronic signal to produce a distorted electronic signal, for compensating for distortion due to transmitting the optical output signal from the first node to the second node through the optical fiber network;

means for adjusting the distortion for changes in the length of optical fiber to reduce the distortion of the optical signal at a receiver at a distal end of the fiber from the laser;

a laser for producing the ouput laser beam with a predetermined wavelength of light;

means to modulate the output laseer beam with the distorted electronic signal;

an optics system for directing the modulated output laser beam into a first one of the optical fibes as an output fiber to transmit the optical output signal;

an optical detector for converting an optical input signal into an input electronic signal; and additional pre-transmission compensation means for electronically compensating for distortions due to using the electronic signal to modulate the laser beam.

7. An information communication system, comprising:

a network of optical fibers;

a first node and second local node communicating through an optical fiber network, each comprising:

means for providing an output electronic information signal;

pre-transmission compensation circuit means to electronically distort the output electronic signal to produce a distorted electronic signal, for compensating for distortion due to transmitting the optical output signal from the first node to the second node through the optical fiber network, and for compensating for distortions due to using the electronic signal to modulate the laser beam;

a laser for producing the ouput laser beam with a predetermined wavelength of light;

means to modulate the output laser beam with the distorted electronic signal;

an optics system for directing the modulated output laser beam into a first one of the optical fibers as an output fiber to transmit the optical output signal;

an optical detector for converting an optical input signal into an input electronic signal;

a third local node; and an optical splitter for providing the output optical signal from the first node to both the second local node and the third local node and providing input optical signals from both the second local node and the third local node to the first node;

and in which:

the length of optical fiber between the first node and the third local node is different than between the first node and the second local node; and the system further comprises post-compensation means including an electronic circuit for compensating for distortion due to the difference in length between the distance from the first node to the second local node and the distance between the first node and third local node.

8. A cable television network, comprising:

a network of optical fibers; and a head-end including:

program means for receiving a multitude of television programs;

gateway means for data communications with other types of networks including a telephone network for receiving and transmitting telephone communications and computer networks for transmitting and receiving computer information;

modulator means for modulating the television programs and the data communications received from the gateway means with multiple carriers each television program having a carrier at a different respective frequency and the data communications using multiple carriers with different respective frequencies;

combiner means for combining multiple carriers into one or more electronic forward signals;

a respective laser for each forward signal, for producing a respective forward laser beam with a predetermined wavelength of light;

respective means for modulating each laser beam with the electronic forward signal to convert the electronic forward signal to a respective optical forward signal;

respective in-line pre-transmission compensation means for each electronic forward signal, including an electronic circuit to distort the electronic forward signal prior to using the electronic signal to modulate the forward laser beam, for compensating for odd order distortion due to the optical forward signal traveling through optical fiber;

a respective optics system for each laser, for directing the modulated forward laser beam into respective ones of the optical fibers for each laser beam;

respective detector means for converting one or more optical return signals from respective ones of the optical fibers, into electronic return signals;

means for providing the electronic return signals as data communications to the gateway means for transmitting the return signals as telephone communications and computer information; and the network further comprising:
  a multitude of separate coaxial cable network trees;
  a plurality of local nodes, each connected to one or more optical fibers and one or more coaxial cable networks, each local node including:
    respective means for converting one or more optical forward signals from respective ones of the optical fibers, into respective electronic forward signals in one or more coaxial cable networks;
    return signal separation means including a respective diplex filter for each coaxial cable network, for separating return data signals from the electronric forward signals in the respective coaxial cable network;
    a return laser for each electronic return signal, for producing a respective return laser beam with a predetermined wavelength of light;
    return pre-transmission compensation means for each electronic return signal, including an electronic circuit to distort the electronic return signal prior to using the electronic signal to modulate the return laser beam to convert the electronic return signal into an optical return signal, for compensating for odd order distortion due to modulating the return laser beam and for compensating for odd order distortion due to the optical return signal traveling through optical fiber;
    a multitude of customer interfaced units connected to the coaxial cable network trees for receiving the forward information signals and for transmitting return data signals, including;
    means for connecting a television display to the coaxial cable network tree for displaying the television programs; and
    means for connecting telephone equipment to the coaxial cable network for receiving and transmitting telephone communications and for connecting computer equipment to the coaxial cable network for transmitting and receiving computer information.

9. A method for optical communication comprising:

receiving an output electronic information signal;

distorting the output electronic information signal to compensate for distortion of the optical signal due to transmitting the optical signal through optical fiber, so that the distortion at a receiver at a distal end of the optical fiber from the laser is reduced;

producing a laser beam using a laser;

modulating the laser beam using the output electronic information signal to produce an optical information signal;

transmitting the optical information signal through the optical fiber to a first and a second optical receiver to produce respective input electronic information signals, the length of the fiber between the laser and the first receiver being different than the length of fiber between the laser and the second receiver;

distorting at least one of the input electronic information signals to compensate for distortion due to the difference in length between the distance from the laser to the first receiver and the distance from the laser to the second receiver.

10. The method of claim 9 in which:

the method further comprises compensating for odd order distortion due to modulating the laser beam with the electronic information signal;

the method further comprises compensating for even order distortion of the optical signal due to modulating the laser beam and for even order distortion of the optical signal due to transmitting the optical signal through the optical fiber; and the distortion of the electric output information signal includes odd order distortion to compensate for odd order distortion due to the optical information signal traveling through the optical fiber.

\* \* \* \* \*

UNITED STATES PATENT AND TRADEMARK OFFICE
CERTIFICATE OF CORRECTION

PATENT NO. : 6,574,389 B1  
DATED : June 3, 2003  
INVENTOR(S) : Marcel F Schemmann et al.

It is certified that error appears in the above-identified patent and that said Letters Patent is hereby corrected as shown below:

<u>Title page,</u>
Insert:
-- Related U.S. Application Data
[60] Provisional No. 60/135,609, filed on May 24, 1999. --

<u>Column 1,</u>
Line 6, should read:
-- This application claims priority to provisional application Serial No.: 60/135,609, filed May 24 1999. --

Signed and Sealed this

Twenty-third Day of December, 2003

JAMES E. ROGAN  
*Director of the United States Patent and Trademark Office*